United States Patent [19]

Sugaya

[11] Patent Number: 4,499,511
[45] Date of Patent: Feb. 12, 1985

[54] SYSTEM FOR DETECTING POSITION OF A READ-WRITE HEAD IN SEEK OPERATION ON A DISK MEMORY HAVING DATA SERVO SPECTORS

[75] Inventor: Toshihiro Sugaya, Tokyo, Japan

[73] Assignee: Tokyo Shibaura Denki Kabushiki Kaisha, Kawasaki, Japan

[21] Appl. No.: 469,144

[22] Filed: Feb. 23, 1983

[30] Foreign Application Priority Data

Feb. 24, 1982 [JP] Japan .................................. 57-28509
Jun. 14, 1982 [JP] Japan ................................. 57-101612

[51] Int. Cl.³ ............................................. G11B 21/08
[52] U.S. Cl. .................................................... 360/78
[58] Field of Search ............... 360/75, 77, 78; 369/43, 369/44

[56] References Cited

U.S. PATENT DOCUMENTS 4,149,200  4/1979  Card ...................................... 360/77
4,238,809  12/1980  Fujiki et al. .......................... 360/131

FOREIGN PATENT DOCUMENTS 0068124  5/1983  European Pat. Off. .
2383496  6/1978  France .
51-131607  11/1976  Japan .

OTHER PUBLICATIONS

IBM Technical Disclosure Bulletin, vol. 23, No. 1, Jun. 1980, pp. 304–305, Pattern for Buried Servo, T. D. Howell.

Primary Examiner—George G. Stellar
Attorney, Agent, or Firm—Oblon, Fisher, Spivak, McClelland & Maier

[57] ABSTRACT

A system for detecting a head position for use in a tracking servo system to accurately and quickly place a read-write head on a selected data track of a magnetic disk memory. The magnetic disk comprises data sectors and servo sectors embedded between the data sectors. A two-phase servo information pattern of a 4-track period is recorded on each of the servo sectors. Servo information is reproduced by the read-write head from each servo sector to produce two-phase first and second position signals which vary like a substantially trapezoidal waveform as a function of head position. A track on which the head is present among the tracks within one period of the servo information pattern is detected dependent on the polarity relation between the first and second position signals. Third and fourth position signals are formed which respectively correspond to the sum of and the difference between the first and second position signals. The present position of the head within the detected track is accurately obtained in accordance with either one of the third and fourth position signals which varies linearly in the detected track. A head actuator is controlled in accordance with a distance between the present position of the head and the selected track, so that the head is accurately and quickly positioned on the target track.

9 Claims, 17 Drawing Figures

F I G. 8
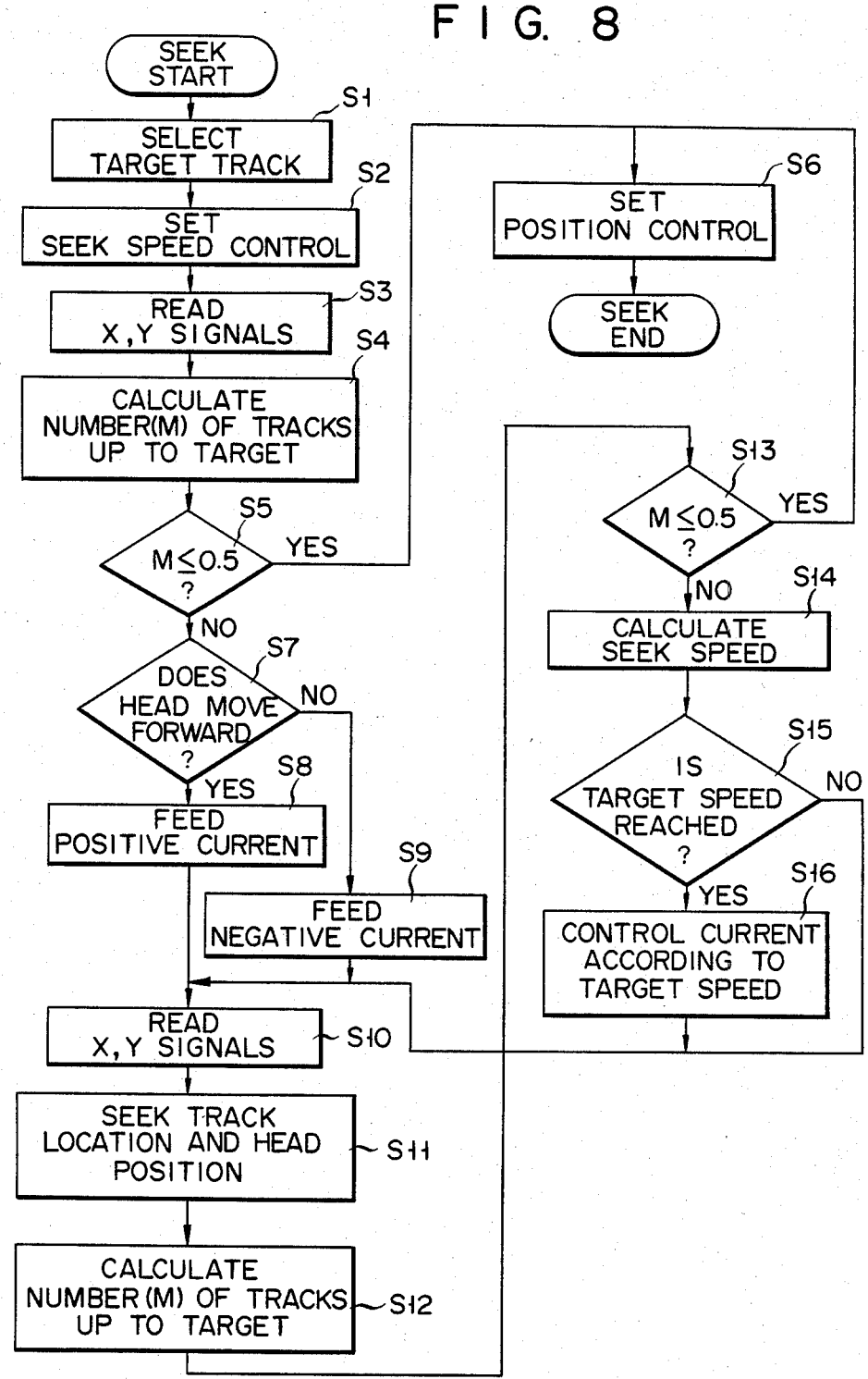

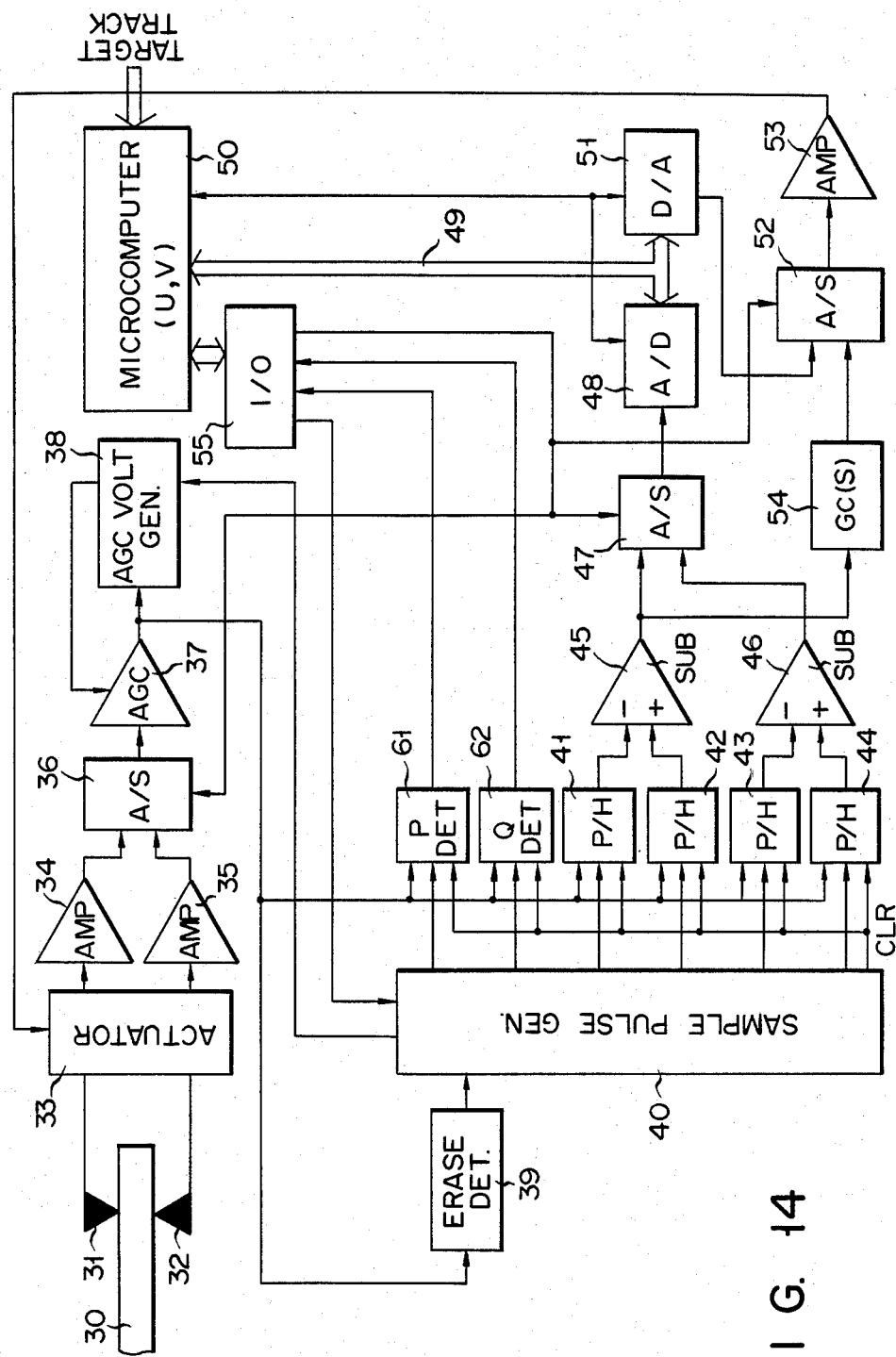
F I G. 14

SYSTEM FOR DETECTING POSITION OF A READ-WRITE HEAD IN SEEK OPERATION ON A DISK MEMORY HAVING DATA SERVO SPECTORS

BACKGROUND OF THE INVENTION

The present invention relates to a system for detecting the position of a read-write head on a disk memory such as a magnetic disk and an optical disk.

Recently magnetic or optical disks on which a plurality of concentric circular data tracks are formed have been widely used as one type of memory device. In order to access a selected track on the disk it is desired to accurately and quickly place a read-write head on the selected track. For this purpose, a tracking servo system is required to accurately and quickly position the head at the selected track.

A servo-surface servo (dedicated servo) system is known as one type of conventional servo system which carries servo information on a predetermined side of one of stacked magnetic disks. With a magnetic disk memory apparatus using the servo-surface servo system, there is a disadvantage that an off-track is liable to occur between a servo track and a data track due to the thermal expansion of the disks, and the inclination of a spindle for holding disks and a head carriage. The off-track can be seemingly avoided by lowering the track density of disks. If only one disk is used in a memory apparatus with the servo-surface servo system, only one side thereof is used to store data. Namely, in the case of the servo-surface servo system the utilization of disk surfaces for a high track density is limited.

In order to eliminate the disadvantage of the servo-surface servo system, various types of data-surface servo systems have been developed which utilize servo information recorded on a data surface. As a typical example, an embedded-servo system is proposed wherein a disk data surface is divided into a plurality of data sectors (e.g., 32 sectors), and servo sectors which carry servo information are embedded between data sectors. With the embedded-servo system, disks and servo data processing circuit may be simple in construction. For this reason, the embedded-servo system is used in a cartridge-type magnetic disk storage system.

In the tracking servo system of the magnetic disk apparatus, the present position of a head moving to seek a target track on a disk is detected in accordance with position signals obtained from servo information reproduced from the disk to compute a head speed and the number of tracks up to the target track so that the head is properly controlled in accordance with a head-speed curve which is set in advance. Therefore, it is important to accurately detect the present position of the moving head in accordance with the position signals.

In practice, however, it is difficult to accurately detect the position of the head in accordance with the position signals obtained from the servo information due to the influence of S/N ratio, variation in level signal, and waveform of the position signals.

In the embedded servo system previously described, since the servo-information is obtained only from the servo sectors, continuous positioning control cannot be performed. Therefore, when the head is moved at a high speed, the position signals based on the servo information are obtained incompletely. As a result, the head speed control and the head positioning to the target track will be not performed. Accordingly, the head speed is limited.

With a conventional position detection system, a cylinder pulse is generated each time the position signal crosses the zero level. The cylinder pulses thus generated are counted by a counter to determine the present position of the head. When this position detection system is applied to the embedded-servo system having a two-phase dibit pattern embedded, the cylinder pulse is obtained every two tracks. Therefore, the head speed is limited within one track/sector. This system, therefore, requires a relatively long access time, as compared with the servo-surface servo system.

SUMMARY OF THE INVENTION

It is an object of the present invention to provide a head position detection system which uses an embedded-servo system and allows precise detection of the present position of a moving head in accordance with position signals obtained from servo information recorded on servo sectors of a disk.

It is another object of the present invention to provide a head positioning system adapted for an embedded-servo system which enables high speed seek of a target track.

A magnetic disk to which the position detection system of the present invention is applied comprises data sectors having concentric data tracks, and servo sectors having concentric servo tracks and embedded between adjacent data sectors. On each servo sector two-phase servo information pattern having a period of four tracks is recorded across the servo tracks or in the radial direction of the disk.

During the seek operation, first, second, third and fourth position information having amplitude levels varying with the position of a read-write head are extracted from the two-phase servo information which is reproduced from each servo sector of the rotating disk by the read-write head which is moved by a head actuator. A first position signal is formed which represents a difference between the first and second position information. Similarly, a second position signal is produced which represents a difference between the third and fourth position information. Each of the first and second position signals has a 4-track period and varies like a trapezoidal waveform as a function of the head position. The first and second position signals are displaced in phase from each other by one track.

According to the head position detection system of the present invention, the polarities of the first and second position signals are examined to detect a track section, at which the head is present, among the track sections within one period of the servo information pattern. Further, third and fourth position signals are formed which are indicative of the sum of and the difference between the first and second position signals, respectively. The third and fourth position signals are displaced in phase from each other by one track, and vary linearly within the respective adjacent track sections. The present position of the head within the track section at which the head is present is detected on the basis of the third or fourth position signal which varies linearly within this track section. The head actuator is controlled in accordance with a distance between the present position of the head and a target track to place the head on the target track.

According to the present invention, the detection of a track section at which the head is present is not performed by the level relationship between the first and second position signals, but by the polarity relationship therebetween. The track duration detection can therefore be easily and accurately performed. Furthermore, the present position of the head within the track section at which it is present can be accurately detected by the third or fourth position signal which varies linearly within the said track section.

When the two-phase servo information pattern having the 4-track period is used, a target track can be seeked accurately and quickly at a head speed within 4 tracks/sector. Furthermore, when a servo information pattern having an 8-track period is provided in addition to the 4-track period pattern or a servo information pattern having 16-track period is provided in addition to the 4-track and 8-track period pattern, the head speed is allowed up to 8 tracks/sector or 16 tracks/sector to seek the target track.

BRIEF DESCRIPTION OF THE DRAWINGS

FIG. 8 is a flow chart for explaining the operation of the tracking servo system shown in FIG. 7;

FIG. 14 is a block diagram of a head tracking servo system which is applied to the servo information pattern of FIG. 9.

DETAILED DESCRIPTION OF THE PREFERRED EMBODIMENTS

Figure 1:
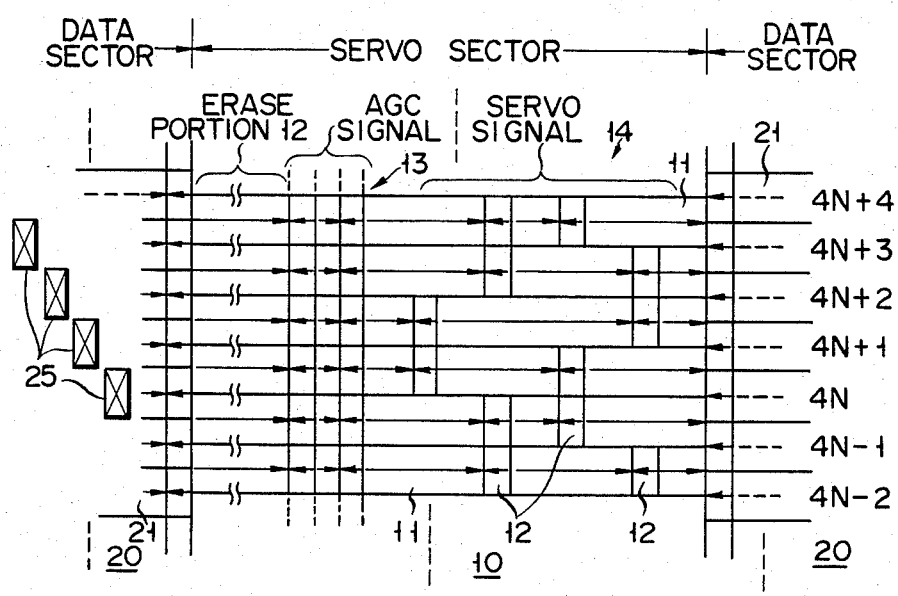
FIG. 1 shows a magnetic pattern of a servo sector having a two-phase dibit servo information pattern recorded and embedded between data sectors of a magnetic disk adapted for an embedded-servo system.

FIG. 1 schematically shows part of a magnetic disk memory on which a two-phase dibit pattern is embedded as servo information in a servo sector. Reference numeral 10 denotes a servo sector which is embedded between data sectors 20. Servo and data tracks 11 and 21 have an equal track width and displaced from each other one half the track width. The servo sector 10 is magnetized as indicated by arrows to form an erase portion 12, AGC (automatic gain control) information 13, and two-phase servo information 14.

Erase portion 12 is formed at the leading portion of servo track 11 and has the longest erase time in each of data and servo tracks, so that it is used for detecting the servo sector. The AGC signal 13 is used to control the amplitude of the servo information signals to be reproduced. The two-phase servo pattern 14 is formed by partial patterns 12, each having a length of two track widths, to have a period of 4 tracks. More specifically, the servo pattern 14 comprises first- and second-phase servo patterns each having staggered alternate arrays of partial patterns 12. The first and second phase servo patterns are arranged with a displacement of one track therebetween as shown. The configuration of the servo sector as described above is conventional.

By way of example, a magnetic disk has 32 data sectors and is driven at a speed of 3,600 rpm. Each servo sector is embedded between two adjacent data sectors. The length of one track of the servo sector is considerably shorter than that of the data track of the data sector. Track numbers starting from zero are assigned to the data tracks from the outermost track to the innermost track. During the seek operation, a read-write head moves from the outermost track to the innermost track of a disk rotating at the aforesaid speed. This seek operation is called "forward seek". Alternatively, the head moves from the innermost track to the outermost track. This seek operation is called "reverse seek". The servo sector is considerably shorter than the data sector, so that the head traces the servo sector substantially parallel to the servo track, irrespective of the direction of movement of the head during the seek operation.

Figure 2A:
FIGS. 2A to 2D show waveforms of output signals of a read-write head obtained when the head is accurately placed on data tracks of data sector.
Figure 2B:
Figure 2C:
Figure 2D:
Figure 1:
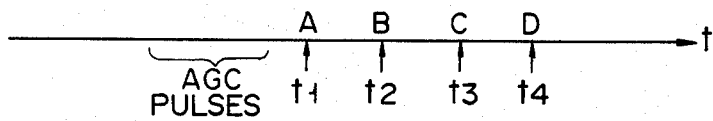

FIGS. 2A to 2D show waveforms of output signals of the read-write head which are obtained from the magnetic pattern shown in FIG. 1. More specifically, FIG. 2A shows the waveform of the output signal obtained when the head 25 is placed on a data track $4N+3$. When the head 25 is placed on data tracks $4N+2$, $4N+1$ and $4N$, the output signals shown in FIGS. 2B to 2D are obtained, respectively. Position information signals A, B, C and D are extracted from the reproduced servo information signal by sampling an output signal of head 25 at given time periods including points t1, t2, t3 and t4 in time, respectively, and holding through peak hold circuits peak values of the sampled output signal within the sampling time periods.

Position signals X and Y which indicate the head position in each servo sector are obtained for each servo sector by the following arithmetic operations:

$$X = A - B$$

$$Y = C - D$$

Figure 3:
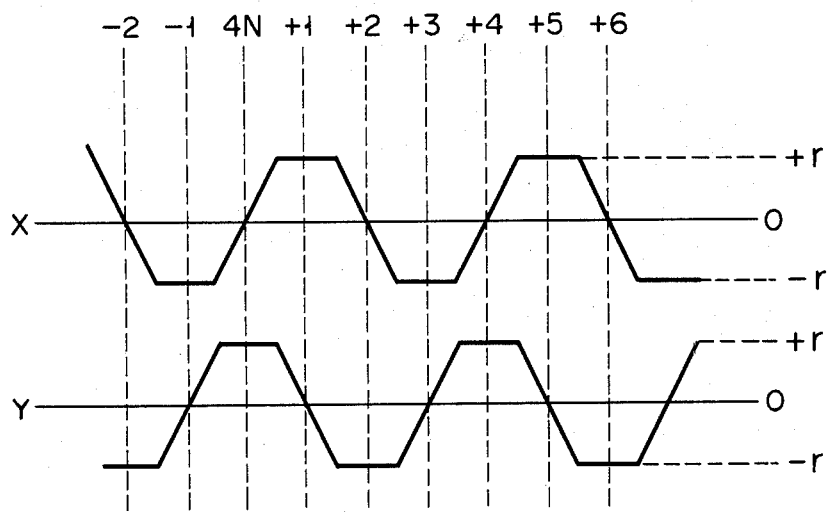
FIG. 3 shows ideal waveforms of position signals which are a function of the head position, and are obtained from position information extracted from the servo information reproduced from the servo sector by the read-write head.

When the head speed is sufficiently lower than the sector speed, the position signals X and Y will be depicted as a function of the head position on tracks as shown in FIG. 3. As may be apparent from the magnetic pattern of FIG. 1, when head 25 is on a data track, $A = B$ or $C = D$. Therefore, $X = 0$ or $Y = 0$ represents the on-track condition. For example, when head 25 is located on track $4N$, $X = 0$ and $Y = +r$ (maximum value).

As may be apparent from FIG. 3, position signals X and Y are of such two-phase trapezoidal waveforms each having flat and ramp portions that when one of position signals X and Y is on the flat portion, the other is on the ramp portion, and vice versa. And each of position signals X and Y has a period of four tracks. Therefore, when the head speed does not exceed 4 tracks/sector, the head position can be detected in accordance with position signals X and Y.

However, in practice, the head position cannot be accurately detected by position signals X and Y, for the following reasons. First, it is practically difficult to detect whether position signals X and Y are on the flat or ramp portion due to influences by variations of the position signals and S/N ratio. Second, in practice, position signals X and Y do not have the ideal trapezoidal waveform as shown in FIG. 3, but have a curved shape at each boundary between the flat and ramp portions. In particular, the curved shape makes the accurate position determination difficult.

Figure 4:
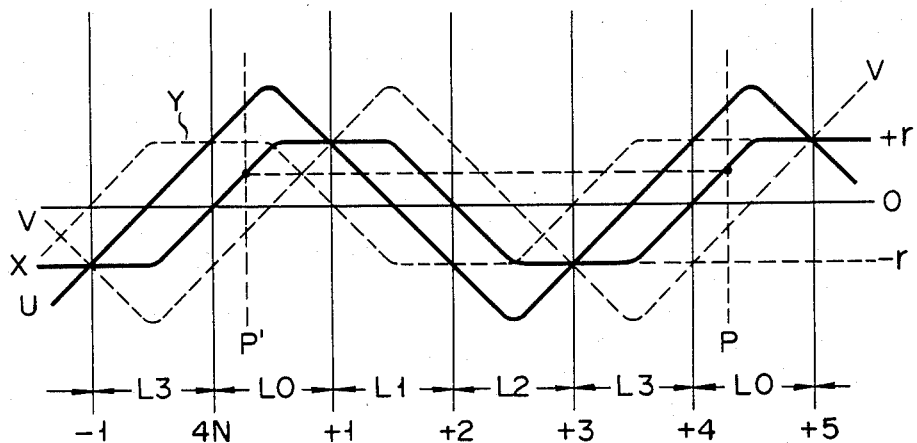
FIG. 4 waveform diagrams of position signals for explaining the position detection system according to the present invention.

According to the present invention, third and fourth position signals U (=X+Y) and V (=X−Y) are formed by first and second signals X and Y, as shown in FIG. 4. Referring to FIG. 4, one period of each position signal is divided into four track sections L0 to L3. It is assumed that track 4N is included in section L0, track 4N+1 in section L1, track 4N+2 in section L2, and track 4N+3 in section L3. It should be noted that because the nonlinear property of first and second position signals X and Y is cancelled out each of third and fourth position signals U and V is linear in alternate track sections.

The head position detection system of this invention will be described which uses position signals X, Y, U and V.

As will be readily understood from FIG. 4, the four track sections L0, L1, L2 and L3 are detected by first and second position signals X and Y as follows:

L0→X≧0, Y>0

L1→X>0, Y≦0

L2→X≦0, Y<0

L3→X<0, Y≧0

Namely, according to this detection method for the track sections the level detection of position signals X and Y needs not be performed, but only the porality detection (including zero level detection) of position signals X and Y suffices. The present position of the head in a detected track section can be determined by the instantaneous level of third or fourth position signal U or V, which varies linearly in the detected track section.

Figure 5:
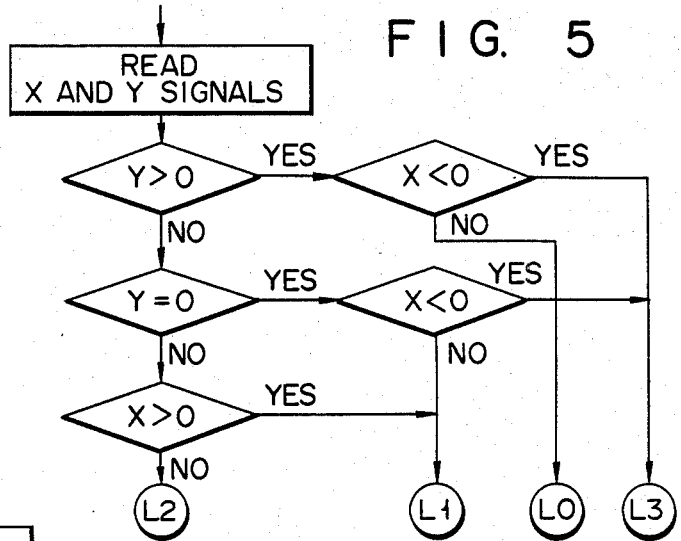
FIG. 5 is a flow chart for detecting a track section within one period of the two-phase servo information pattern in accordance with the position signals.
Figure 6:
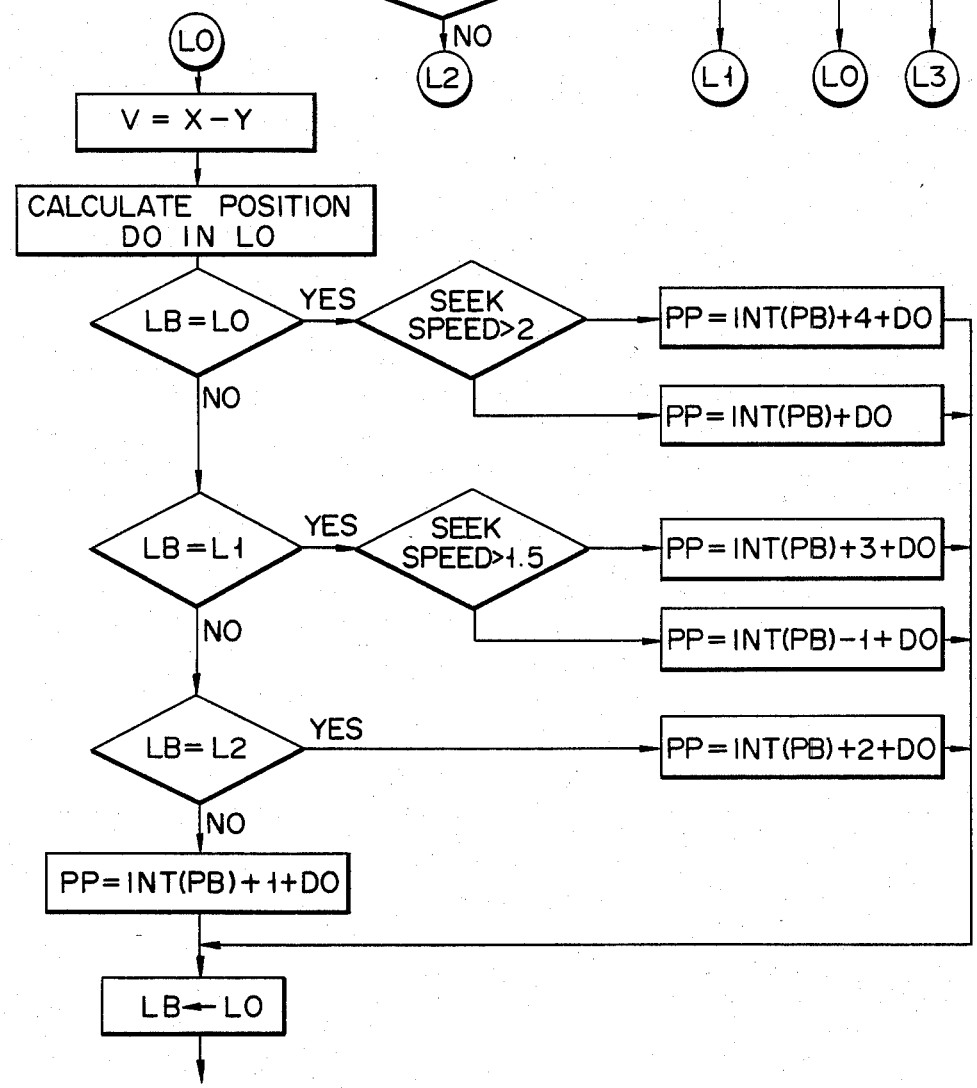
FIG. 6 is a flow chart for obtaining the present position of the head within the detected track section.

FIG. 5 is a flow chart for the above described track section detection during the forward seek operation. This flow chart will not require a detailed description. FIG. 6 is a flow chart to obtain the present position PP when the head is placed in track section L0.

A method of determining the present position of the head will be described with reference to the flow chart of FIG. 6. If the head is positioned at a point P in FIG. 4, the track section in which the head is present can be obtained as L0 from the flow chart of FIG. 5. A head position D0 within track section L0 can be obtained, using fourth position signal V (=X−Y) which varies linearly in this section L0 as follows:

$$D0 = (V/2r) + 0.5$$

The present position PP of the head can be obtained if the section LB of the previous servo sector at which the head positioned, the head position PB within the section LB, and the head speed (4 tracks/sector or less) can be known.

If the section LB of the previous sector is L0, it is regarded that head 25 moved from either one of the section L0 including the point P in FIG. 4 and the section L0 including a point P′ to the point P. In case where the head moved within section L0 which includes point P, the head speed will be at most one track/sector. On the other hand, when the head moved from section L0 which includes point P′, the head speed is not more than 3 tracks/sector. Therefore, by referring to the head speed (seek speed) the discrimination between section L0 including point P and section L0 including point P′ is made possible. The seek speed is a head moving speed at the previous servo sector. In the case of the movement of head within section L0 including point P the present position PP of head is given by $$PP = INT(PB) + D0$$

where INT(PB) represents the integer of the head position in the previous sector, that is, the track number. When the track section in the previous sector is the section L0 including point P, $INT(PB) = 4N+4$.

When the head moved from the section L0 which includes point P′, the present position PP is given by $$PP = INT(PB) + 4 + D0$$

Let the track section LB of the previous sector be L1. If the head moving direction or the seek direction is indicated by an arrow shown in FIG. 4, and its speed is not less than 2 tracks/sector, then the present position PP of the head is given by $$PP = INT(PB) + 3 + D0$$

However, when the head speed is very slow, it may occur that the head moves reversely due to eccentricity of the disk. In this case, the present position PP is given by $$PP = INT(PB) - 1 + D0$$

Namely, when the previous track section is L1, an accurate present position can be obtained with reference to the seek speed.

When the previous track section LB is L2 or L3, the seek speed need not be referred to. When LB is L2, the present position PP is $$PP = INT(PB) + 2 + D0$$

If LB is L3, then $$PP = INT(PB) + 1 + D0$$

The detected section L0 is registered as an updated previous section LB and is used for position detection at the succeeding servo sector.

The above description was made of the case where the head is driven in the forward direction, and the head is placed within section L0. However, even if the head is positioned within any other track section, the present position of the head can be obtained in the same manner as described above, except that position D1 within section L1 is $0.5-(U/2r)$, position D2 within section L2 is $0.5-(V/2r)$, and position D3 within section L3 is $(U/2r)+0.5$.

As described above, the position detection system of the present invention has advantages over the conventional system to count cylinder pulses in that (1) The position detection is made possible at a high seek speed several times as high as that of the conventional method, and (2) The head position within the track section can be accurately detected.

According to the position detection system of the present invention, therefore, the head can be positioned on a target track at high speed and high precision.

Figure 7:
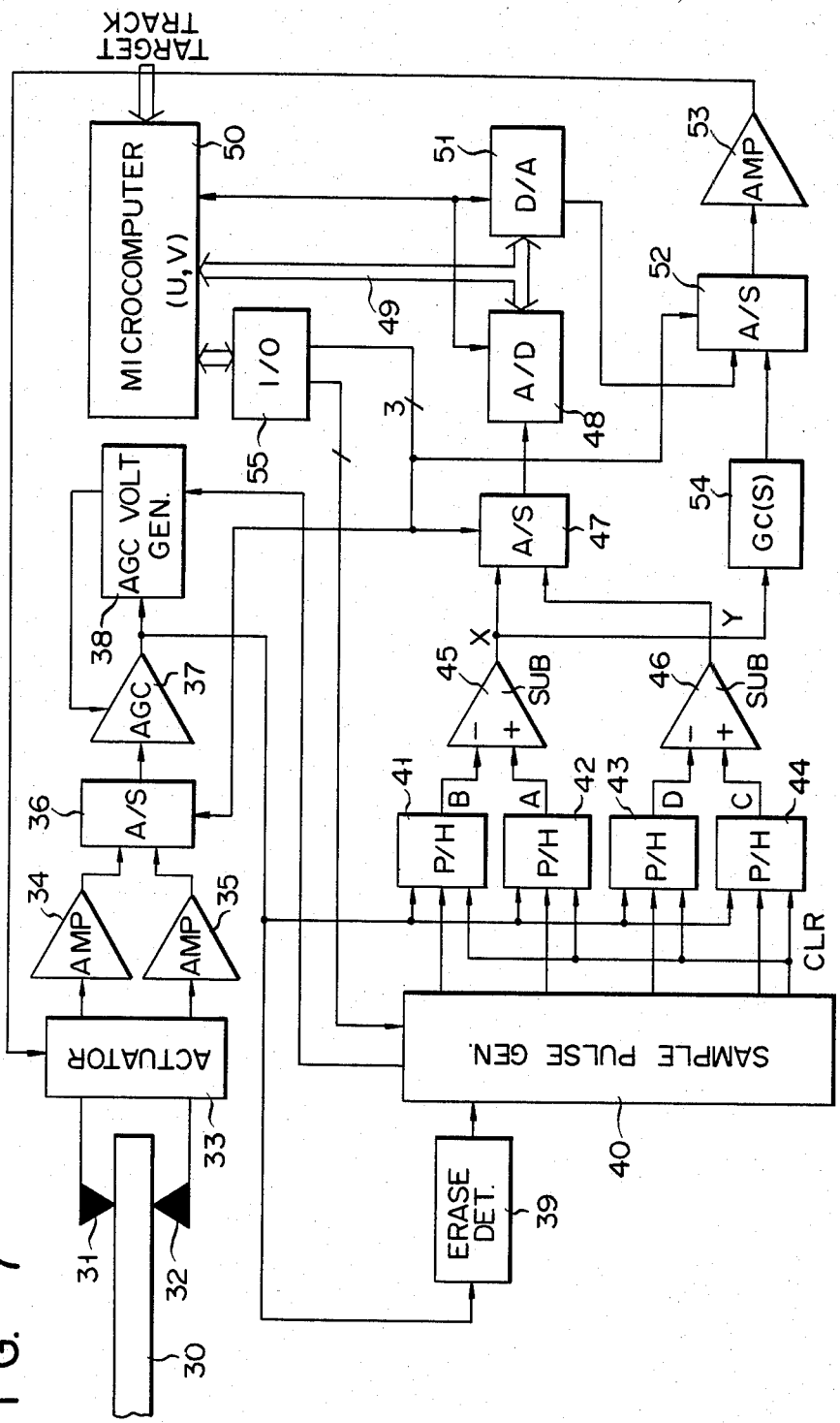
FIG. 7 is a block diagram of a head tracking servo system using the position detection system of the present invention.

FIG. 7 is a block diagram of a servo system using the aforesaid position detection system. Read-write heads 31 and 32 are respectively associated with the top and bottom surfaces of a magnetic disk 30 having data and servo sectors thereon as previously described. Heads 31 and 32 are actuated by an actuator or positioner 33. Output signals of heads 31 and 32 are amplified by amplifiers 34 and 35, respectively, and then applied to an analog switch 36. An output signal of analog switch 36 is applied to a gain-controlled amplifier 37. An output signal of gain-controlled amplifier 37 is applied to a gain-control voltage generator 38, an erase detector 39 and peak hold circuits 41 to 44.

Erase detector 39 has a retriggerable monostable multivibrator and is arranged to detect the erase portion 12 which has the longest erase time and is formed in the beginning portion of servo sector 10 shown in FIG. 1. The servo sector is detected by detecting the erase portion. Upon detecting erase portion 12, erase detector 39 enables a sampling pulse generator 40 to apply sampling pulses to AGC voltage generator 38 and peak hold circuits 41 to 44.

In response to the sampling pulses from sampling pulse generator 40, AGC voltage generator 38 extracts the AGC pulses shown in FIG. 2 from the output signal of gain-controlled amplifier 37 and produces a AGC voltage to control the gain of gain-controlled amplifier 37, so that the variation of the peak values of position information A, B, C and D obtained from the servo pattern may be avoided.

Sampling pulse generator 40 generates window pulses of a predetermined duration which include points t1, t2, t3 and t4 shown in FIG. 2, respectively, to cause peak hold circuits 41 to 44 to hold the position information B, A, D and C, respectively. Output signals of peak hold circuits 41 and 42 are applied to a subtractor 45 such as an operational amplifier to form the position signal X ($=A-B$). Similarly, output signals of sample hold circuits 43 and 44 are applied to a subtractor 46 to produce the position signal Y ($=C-D$). Peak hold circuits 41 to 44 are cleared in response to a clear signal CLR from sampling pulse generator 40 which is generated each time a servo sector is detected.

Output signals of subtractors 45 and 46 are selectively applied to an analog-to-digital (A/D) converter 48 through an analog switch 47. A/D converter 48 converts output signals X and Y of subtractors 45 and 46 into digital signals which are applied to a microcomputer 50 via a data bus 49.

Microcomputer 50 reads first and second position signals X and Y and forms third and fourth position signals U and V to seek the present position PP of the head, and the head speed. Furthermore, microcomputer 50 computes the number of tracks up to a target track which is externally specified. Microcomputer 50 then extracts data of the target speed corresponding to the number of tracks from a data table and applies speed data indicating a difference between the present speed and the target speed to a digital-to-analog (D/A) converter 51 through data bus 49.

An output signal of D/A converter 51 is used for head speed control, and the output signal of subtractor 45 is used for head position control after the head speed control is completed. More specifically, during the head speed control, the output signal of D/A converter 51 is applied to head actuator 33 through an analog switch 52 and an amplifier 53 to control the head moving speed. When the head comes near to the target track within 0.5 track width, the servo system is switched from the speed control to the position control, so that the output signal of subtractor 45 is applied to actuator 33 through a compensating circuit 54 for stabilizing the servo system and analog switch 52.

The position control will now be described in detail. Assume that the servo system is designed such that the head stops in the position control mode when the positive-going ramp of each of position signals X and Y crosses the zero level. As may be apparent from FIG. 4, the first position signal X must be utilized in order to stop the head on track 4N in the position control mode. Similarly, the position signals $-Y$, $-X$ and Y must be utilized to stop the head on tracks $4N+1$, $4N+2$ and $4N+3$, respectively. For this purpose, it is required that, in the position control mode, subtractor 45 selectively produce one of signals $+X$, $-X$, $+Y$ and $-Y$. This will be achieved in such a way that sampling pulse generator 40 varies the phases of the sampling pulses applied to peak hold circuits 41 and 42 in response to an instruction applied from microcomputer 50 through I/O unit 55. Namely, where the sampling pulses are applied to sample hold circuits 41 and 42 in such a way that circuits 41 and 42 hold position information signals A and B, respectively, then subtractor 45 produces signal $-X$. Where the sampling pulses are applied in such a way that sample hold circuits 41 and 42 hold the position information signals D and C, respectively, then subtractor 45 produces signal Y. When peak hold circuits 41 and 42 hold the position information signals C and D, respectively, subtractor 45 produces signal $-Y$. In this manner, during the position control mode subtractor 45 selectively produces one of signals X, $-X$, Y and $-Y$ in accordance with the target track.

The operation of the servo system of FIG. 7 will be described with reference to the flow chart of FIG. 8. Together with the initiation of a seek operation, in step S1, a target track is selected so that information as to the target track is applied to microcomputer 50. In step S2, microcomputer 50 sets the servo system to the speed control mode, so that analog switch 52 couples the output of D/A converter 51 to actuator 33 and subtractors 45 and 46 produce the position signals X and Y, respectively. In step S3, microcomputer 50 reads the position signals X and Y and forms the third and fourth position signals U and V to obtain the present position of the head. In step S4, microcomputer 50 calculates the number (M) of tracks from the present position to the target track. It is then determined, in step S5, if the number (M) of tracks is less than or equal to 0.5. If "YES" in step S5, microcomputer 50 switches the servo system to the position control mode in step S6. As a result, analog switch 52 is switched to couple the output of subtractor 45 to actuator 33. In this case, subtractor 45 produces one of the signals X, −X, Y and −Y in accordance with the target track.

However, if "NO" in step in S5, it is determined in step S7 if the head is moving in the forward direction. If "YES" in step S7, microcomputer 50 supplies positive current to actuator 33 through D/A converter 51 in step S8. In this case, a positive output voltage of D/A converter 51 is converted to a positive drive current by amplifier 53. Actuator 33 is responsive to the positive drive current to move the head in the forward direction. However, if "NO" in step S7, microcomputer 50 supplies negative drive current to actuator 33 in step S9. In this case, the head moves in the reverse direction.

While the head is being moved, microcomputer 50 reads the position signals X and Y obtained every servo sector in step S10. In step 11, microcomputer 50 detects a track section in which the head is present and the head position within the track section. In step 12, microcomputer 50 calculates the number (M) of tracks up to the target track. It is then determined in step S13 whether or not the number (M) of tracks is less than or equal to 0.5. If "YES" in step S13, the servo system is switched to the position control mode in step S6 so that the head is positioned on the target track. If "NO" in step S13, the present seek speed is computed in step S14. Subsequently, it is determined in step S15 if the present seek speed has reached the target speed. When the present seek speed has not reached the target speed, the operations are repeated from step S10. However, if "YES" in step S15, the drive current to actuator 33 is controlled in accordance with the target speed. Thereafter, the operations are repeated from step S10. It should be noted that the target speed is not constant during the seek operation but varies in accordance with a target speed characteristic curve depending on the number of tracks from the head position at the start of the seek operation to the target track.

In the above-mentioned embodiment, since only the two-phase dibit servo pattern having a 4-track period is used, the head position can be accurately detected only when the head speed in not more than 4 tracks/sector. By improving the servo pattern according to this invention as described later, the head position will be accurately detected at an increased head speed exceeding 4 tracks/sector.

Figure 9:
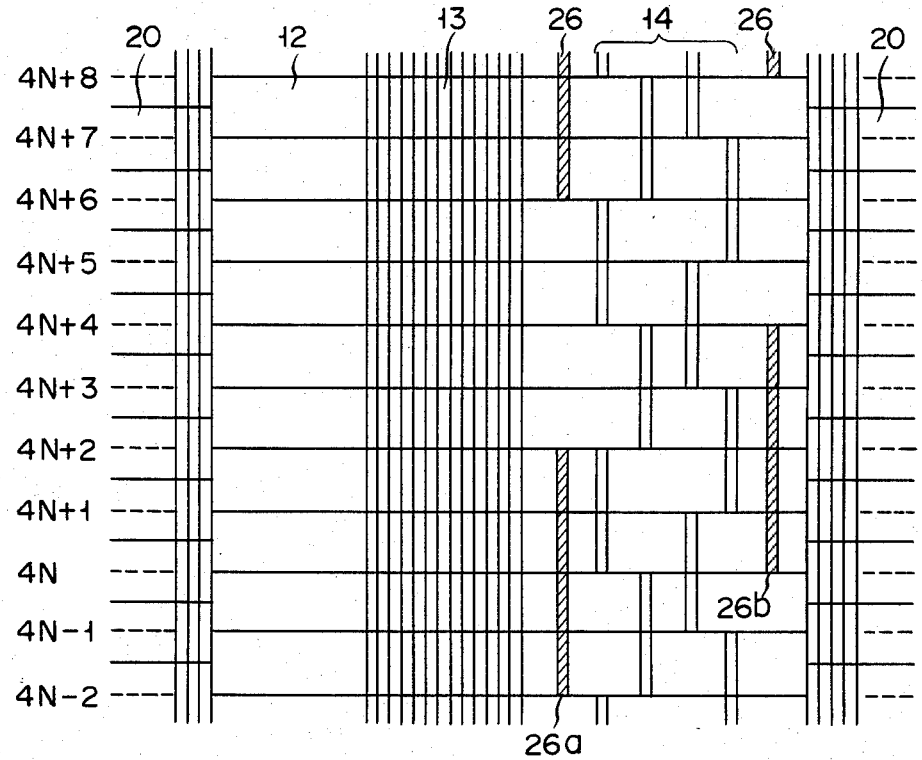
FIG. 9 shows an improved servo information pattern so as to increase the head speed.

FIG. 9 shows the arrangement of a servo sector which allows accurate head position detection at a head speed up to 8 tracks/sector. In FIG. 9, the same reference numerals are used to denote the same parts as those of FIG. 1, and a detailed description thereof will be omitted. In this improved arrangement, a second servo signal pattern 26 is formed in addition to first servo signal pattern 14. In this embodiment, the second servo pattern 26 has an 8-track period and comprises staggered alternate arrays of partial patterns 26a and 26b each having a length of four tracks. The corresponding partial patterns 26a and 26b of the staggered alternate arrays overlap by a length of two tracks.

Figure 10:
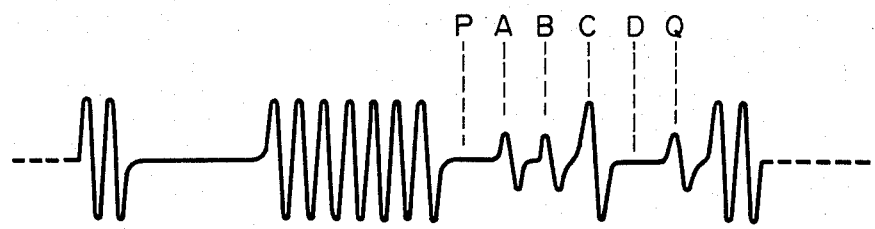
FIG. 10 shows waveforms of output signals of the read-write head which are obtained at a servo sector having servo information pattern of FIG. 9.
Figure 11:
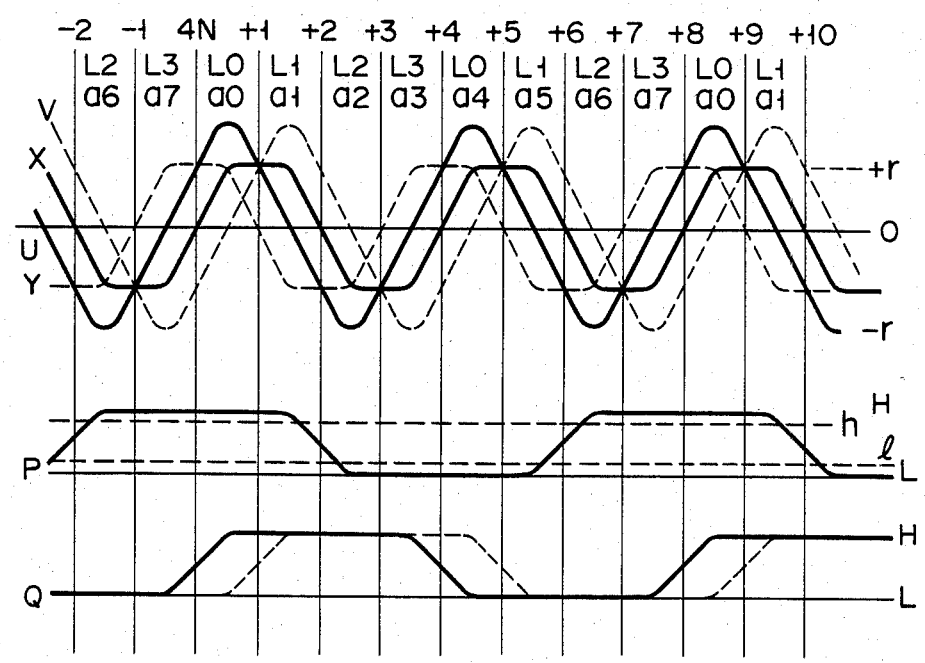
FIG. 11 shows waveforms of position signals obtained from the servo information pattern of in FIG. 9.

FIG. 10 shows an output signal of the head obtained at the servo sector when the head is placed on track 4N+4. Position signals P and Q are obtained from second servo pattern 26 in addition to position information signals A, B, C, and D obtained from first servo pattern 14. The position signals X, Y, U and V obtained from the position information A, B, C and D in accordance with the arithmetic operations previously described, and the position signals P and Q can be expressed as functions of the head position as shown in FIG. 11. Each of position signals P and Q has an 8-track period and flat and ramp portions. The flat portion has a width of three tracks and the ramp portion has a width of one track. The position signals P and Q overlap each other by a width of two tracks.

As will be apparent from the above descriptions, the four track sections L0, L1, L2 and L3 within the 4-track period can be detected by position signals X and Y. However, eight track sections a0 to a7 within the 8-track period cannot be detected by the position signals X and Y. For example, $X \geq 0$ and $Y > 0$ results both in the section a0 (L0) including track 4N and in the section a4 (L0) including track 4N+4. Therefore, it is found that the discrimination between sections a0 and a4 cannot be made. However, it is possible to distinguish between sections a0 and a4 by referring to position signal P. Namely, the position signal P is high in section a0, while it is low in section a4. On the other hand, it is difficult to distinguish between the section a2 (L2) and the section a6 (L2) by means of only the position signal P since this position signal includes the ramp duration in these sections a2 and a6. However, the discrimination between the sections a2 and a6 is made possible by referring to position signal Q. More specifically, the position signal Q is high in section a2, while it is low in section a6. In this manner, by using position signals P and Q of 8-track period and partially overlapping each other together with position signals X and Y, eight track sections a0 to a7 can be detected under a head speed which does not exceed 8 tracks/sector. When a track section at which the head is present is detected, the present position of the head within the track section is determined using the position signal U or V as previously described.

Figure 12:
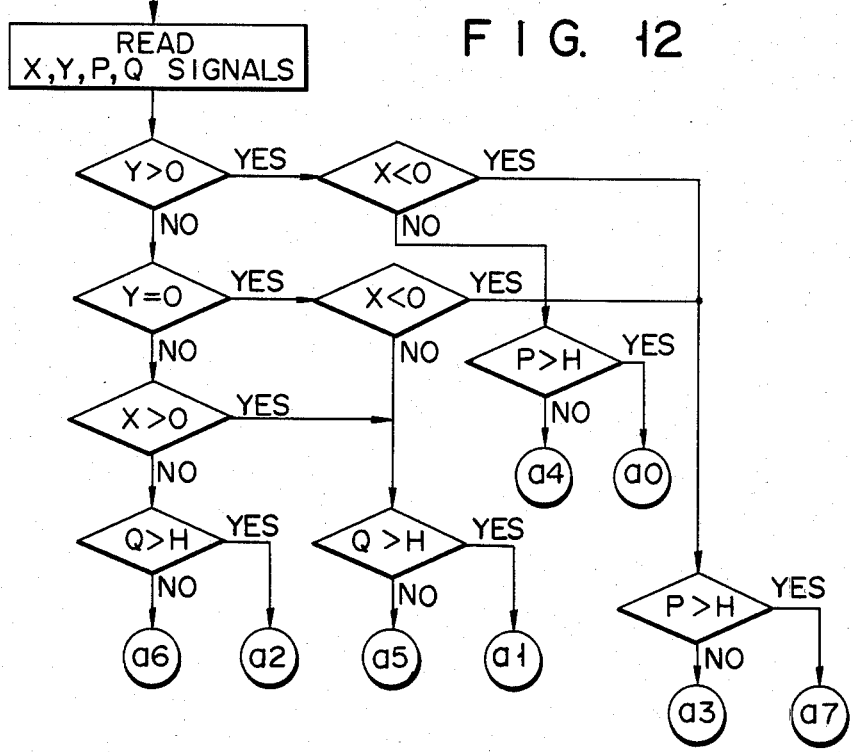
FIG. 12 is a flow chart for detecting a track section within one period of the servo information pattern of in FIG. 9 on the basis of the position signals of FIG. 11.

FIG. 12 is a flow chart for detecting track sections a0 to a7. The detection operation will be readily understood with reference to the signal waveforms shown in FIG. 11.

In the embodiment of FIG. 9, first servo signal pattern 14 is arranged between partial patterns 26a and 26b of second servo signal pattern 26. Alternatively, the alternate array of partial patterns 26b may be arranged between the alternate array of partial patterns 26a and AGC signal pattern 13. In the above embodiment, partial patterns 26a and 26b are arranged to overlap by the width of two tracks. Alternatively, the partial patterns 26a and 26b may be arranged to overlap by one-track width. In this case, the position signal Q has a relation to the position signal P as indicated by the dotted line in FIG. 11, enabling the detection of track sections a0 to a7.

Figure 13:
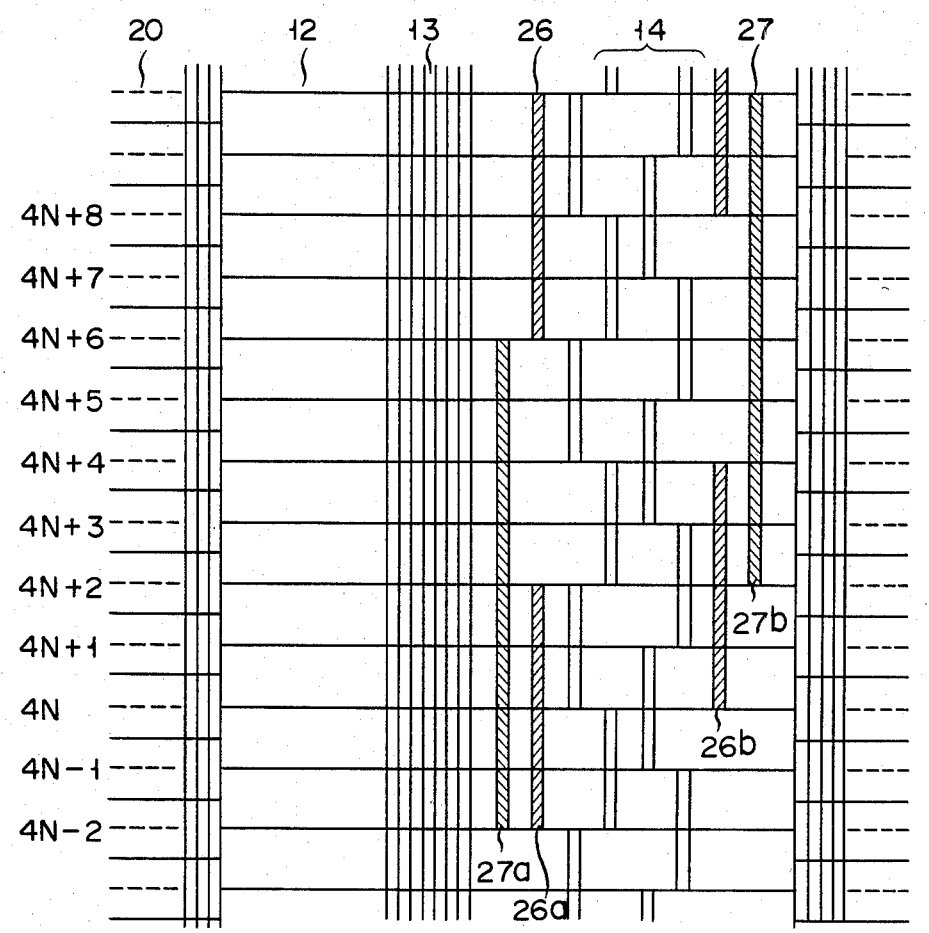
FIG. 13 shows another improved servo information pattern for further increasing the head speed.

As shown in FIG. 13, when a third servo signal pattern 27 having a 16-track period is provided in addition to first and second servo patterns 14 and 26, 16 track sections can be detected at a head speed not more than 16 tracks/sector. The third servo pattern 27 has staggered alternate arrays of partial patterns 27a and 27b each having a length of eight tracks. The partial patterns 27a and 27b are arranged to overlap by a width of at least one track, preferably four tracks.

FIG. 14 shows a servo system like the servo system of FIG. 7 which is adapted for the servo signal pattern shown in FIG. 9. In FIG. 14, the same reference numerals are used to denote the same parts as those of FIG. 7, and a detailed description thereof will be omitted.

P and Q detectors 61 and 62 are provided to detect the position signals P and Q in response to an output signal of gain-controlled amplifier 37. Each of detectors 61 and 62 may be constituted by a voltage comparator for detecting a high level (H) of the input position signal, an AND gate connected to an output of the voltage comparator and enabled by a given sampling pulse from sampling pulse generator 40, and a flip-flop circuit triggered by an output of the AND gate. Output signals of the flip-flop circuits of P and Q detectors 61 and 62 are applied to microcomputer 50 through I/O unit 55. Microcomputer 50 reads the position signals X, Y, P and Q to detect a track section within 8-track period at which the head is placed and obtain the head position in the track section using position signals U and V. The head speed control and the head position control are performed in the same manner as in the case using the position signals X, Y, U and V.

In the embodiments so far described, a magnetic disk is used as a recording medium. However, it is obvious that the position detection system of the present invention may be applied to an optical disk system by replacing the magnetized pattern of a disk with an optical pattern.

What is claimed is:

1. A method of detecting the position of a head which is moved by an actuator to seek a selected data track on a disk comprising data sectors each having concentric data tracks, and servo sectors each having concentric servo tracks and embedded between said data sectors, a two-phase servo information pattern having a period of 4 tracks being recorded on each of said servo sectors in the radial direction of said disk, comprising the steps of:

extracting first, second, third and fourth position information from the two-phase servo information reproduced by said head from each of said servo sectors of said disk which is rotated during a seek operation;

forming a first position signal indicative of a difference between the first and second position information, and a second position signal indicative of a difference between the third and fourth position information;

forming a third position signal indicative of a sum of the first and second position signals and a fourth position signal indicative of a difference between the first and second position signals;

detecting a track within one period of the servo information pattern on which said head is present in accordance with the first and second position signals; and detecting the present position of said head within the detected track in accordance with either one of the third and fourth position signals which depends on the detected track.

2. A method according to claim 1 wherein each of said servo sectors of said disk further comprises a second servo information pattern having a period of 8 tracks and partial patterns which overlap each other by a width of at least one track, and said method further comprises the steps of: extracting fifth and sixth position signals from servo information reproduced by said head from each of said servo sectors on the basis of said second servo information pattern; and detecting a track, which is included in tracks within the period of said second servo information pattern and cannot be detected by the first and second position signals, in accordance with the fifth and sixth position signals.

3. A method according to claim 1 wherein said two-phase servo information pattern comprises a two-phase dibit pattern.

4. A method according to claim 2 wherein said partial patterns of said second servo information pattern are disposed on both sides of said two-phase servo data pattern.

5. An apparatus for detecting the position of a head which is moved by an actuator to seek a selected data track on a disk comprising data sectors each having concentric data tracks, and servo sectors each having concentric servo tracks and embedded between said data sectors, a two-phase servo information pattern having a period of 4 tracks being recorded on each of said servo sectors in the radial direction of said disk, said apparatus comprising:

means for extracting first, second, third and fourth position information from the two-phase servo information reproduced by said head from each of said servo sectors of said disk which is rotated during a seek operation;

means for forming a first position signal indicative of a difference between the first and second position information, and a second position signal indicative of a difference between the third and fourth position information;

means for forming a third position signal indicative of a sum of the first and second position signals and a fourth position signal indicative of a difference between the first and second position signals;

means for detecting a track within one period of the servo information pattern on which said head is present in accordance with the first and second position signals; and means for detecting the present position of said head within the detected track in accordance with either one of the third and fourth position signals which depends on the detected track.

6. An apparatus according to claim 5 wherein said two-phase servo information pattern comprises a two-phase dibit pattern.

7. An apparatus according to claim 5 wherein each of said servo sectors further comprises at least a second servo information pattern having a period of 8 tracks and partial patterns which overlap each other by a width of at least one track; and said track detecting means is arranged to detect a track on which said head is present in accordance with the first and second position signals and position signals obtained by said head from said second servo information pattern.

8. An apparatus for positioning a head on a selected data track of a disk by an actuator, said disk comprising data sectors each having concentric data tracks and servo sectors each having concentric servo tracks and embedded between said data sectors, and a two-phase servo information pattern having a period of 4 tracks being recorded on each of said servo sectors in the radial direction of said disk, said apparatus comprising:

means for extracting first, second, third and fourth position information from servo information reproduced by said head from each of said servo sectors of said disk which is rotated during a seek operation;

first subtractor means for producing a first position signal indicative of a difference between the first and second position information;

second subtractor means for producing a second position signal indicative of a difference between the third and fourth position information;

actuator controlling means for controlling said actuator which moves said head in response to the first and second position signals, said actuator controlling means being arranged to produce third and fourth position signals which respectively correspond to a sum of and a difference between the first and second position signals, to detect a track which is included in tracks within one period of said two-phase servo information pattern and at which said head is present in accordance with polarities of the first and second position signals, to detect a present position of said head within the detected track in accordance with either one of the third and fourth position signals which depends on the detected track, and to control said actuator in accordance with a distance between the present position of said head and the selected data track.

9. An apparatus according to claim 8 wherein said means for extracting the first to fourth position information comprises peak hold circuits for holding peak values of the servo information, reproduced from each of said servo sectors, in successive periods of time.

* * * * *

UNITED STATES PATENT AND TRADEMARK OFFICE
CERTIFICATE OF CORRECTION

PATENT NO. : 4,499,511

DATED : February 12, 1985

INVENTOR(S) : Toshihiro Sugaya et al

It is certified that error appears in the above-identified patent and that said Letters Patent is hereby corrected as shown below:

On the title page:

-- [54] SYSTEM FOR DETECTING POSITION OF A READ-WRITE HEAD IN SEEK OPERATION ON A DISK MEMORY HAVING DATA SERVO SECTORS --

Signed and Sealed this

Eighteenth Day of June 1985

[SEAL]

Attest:

DONALD J. QUIGG

Attesting Officer     Acting Commissioner of Patents and Trademarks